(12) United States Patent
Lee et al.

(10) Patent No.: US 10,075,903 B2
(45) Date of Patent: Sep. 11, 2018

(54) METHOD AND APPARATUS FOR RECEIVING SYSTEM INFORMATION IN WIRELESS COMMUNICATION SYSTEM

(71) Applicant: LG ELECTRONICS INC., Seoul (KR)

(72) Inventors: Youngdae Lee, Seoul (KR); Sungjun Park, Seoul (KR); Seungjune Yi, Seoul (KR); Sunghoon Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/428,290

(22) PCT Filed: Sep. 17, 2013

(86) PCT No.: PCT/KR2013/008408
§ 371 (c)(1),
(2) Date: Mar. 13, 2015

(87) PCT Pub. No.: WO2014/046462
PCT Pub. Date: Mar. 27, 2014

(65) Prior Publication Data
US 2015/0249952 A1     Sep. 3, 2015

Related U.S. Application Data

(60) Provisional application No. 61/703,253, filed on Sep. 19, 2012, provisional application No. 61/705,143, filed on Sep. 25, 2012.

(51) Int. Cl.
*H04H 20/71*     (2008.01)
*H04W 48/10*     (2009.01)
(Continued)

(52) U.S. Cl.
CPC .......... *H04W 48/10* (2013.01); *H04L 5/0073* (2013.01); *H04W 4/06* (2013.01); *H04W 48/12* (2013.01); *H04W 4/90* (2018.02); *H04W 68/02* (2013.01)

(58) Field of Classification Search
None
See application file for complete search history.

(56) References Cited

U.S. PATENT DOCUMENTS

2008/0273514 A1* 11/2008 Kuo ................ H04W 68/00
                                                      370/342
2009/0310503 A1* 12/2009 Tenny .............. H04W 68/00
                                                      370/252

(Continued)

FOREIGN PATENT DOCUMENTS

CN     101601208 A     12/2009
CN     101778342 A     7/2010
(Continued)

OTHER PUBLICATIONS

Renesas Mobile Europe Ltd., 'PWS Terminology Alignment (CMAS/KPAS)', R2-121842, 3GPP TSG-RAN WG2 Meeting #77bis, Jeju, South Korea, Mar. 26-30, 2012 (http://3gpp.org/ftp/tsg_ran/WG2_RL2/TSGR2_77bis/Docs/R2-121842.zip) See paragraphs 1-13; and figs. 5.2.1.3-1, 5.3.2.1-1.

(Continued)

*Primary Examiner* — Phirin Sam
(74) *Attorney, Agent, or Firm* — Dentons US LLP

(57) ABSTRACT

A method and apparatus for receiving system information in a wireless communication system is provided. A user equipment (UE) receives a system information modification from an eNodeB (eNB) on a UE-dedicated channel via a radio resource control (RRC) connection reconfiguration mes- (Continued)

sage, and receives at least one system information block from the enB according to system information modification.

14 Claims, 19 Drawing Sheets

(51) Int. Cl.
| | |
|---|---|
| *H04W 4/06* | (2009.01) |
| *H04L 5/00* | (2006.01) |
| *H04W 48/12* | (2009.01) |
| *H04W 68/02* | (2009.01) |
| *H04W 4/90* | (2018.01) |

(56) References Cited

U.S. PATENT DOCUMENTS

| | | | | |
|---|---|---|---|---|
| 2009/0316603 | A1* | 12/2009 | Amerga | H04W 48/08 370/254 |
| 2010/0254360 | A1* | 10/2010 | Ueda | H04W 48/12 370/338 |
| 2010/0267366 | A1* | 10/2010 | Du | H04W 48/08 455/412.2 |
| 2011/0105119 | A1* | 5/2011 | Bienas | H04W 36/0055 455/436 |
| 2011/0110327 | A1 | 5/2011 | Ramachandran et al. | |
| 2011/0171929 | A1* | 7/2011 | Tamura | H04W 48/12 455/404.1 |
| 2011/0243034 | A1* | 10/2011 | Yamada | H04L 5/001 370/254 |
| 2011/0269448 | A1* | 11/2011 | Chen | H04W 48/12 455/422.1 |
| 2011/0281615 | A1* | 11/2011 | Yamada | H04W 36/0094 455/524 |
| 2012/0052860 | A1* | 3/2012 | Faronius | H04W 68/02 455/426.1 |
| 2012/0231820 | A1* | 9/2012 | Chun | H04W 48/12 455/458 |
| 2012/0250578 | A1* | 10/2012 | Pani | H04W 48/12 370/254 |
| 2012/0250601 | A1* | 10/2012 | Choi | H04W 88/04 370/315 |
| 2012/0270555 | A1* | 10/2012 | Wei | H04W 48/08 455/450 |
| 2012/0276933 | A1* | 11/2012 | Laitinen | H04W 68/025 455/458 |
| 2012/0281566 | A1* | 11/2012 | Pelletier | H04W 76/046 370/252 |
| 2012/0327848 | A1* | 12/2012 | Somasundaram | H04W 48/16 370/328 |
| 2013/0039338 | A1* | 2/2013 | Suzuki | H04W 36/0094 370/331 |
| 2013/0084910 | A1* | 4/2013 | Suzuki | H04W 24/02 455/515 |
| 2013/0114438 | A1* | 5/2013 | Bhattad | H04J 11/005 370/252 |
| 2013/0142291 | A1* | 6/2013 | Dinan | H04L 27/2666 375/343 |
| 2013/0258884 | A1* | 10/2013 | Xu | H04W 52/36 370/252 |
| 2014/0086208 | A1* | 3/2014 | Murray | H04W 36/0072 370/331 |
| 2014/0112180 | A1* | 4/2014 | Axmon | H04W 24/10 370/252 |
| 2014/0219152 | A1* | 8/2014 | Anto; Aram | H04W 52/08 370/311 |
| 2015/0009985 | A1* | 1/2015 | Kwon | H04W 56/0005 370/350 |
| 2017/0222786 | A1* | 8/2017 | Yamada | H04L 5/0058 |
| 2018/0103451 | A1* | 4/2018 | Choi | H04W 68/02 |

FOREIGN PATENT DOCUMENTS

| | | |
|---|---|---|
| CN | 102067676 A | 5/2011 |
| CN | 102238479 A | 11/2011 |
| CN | 102415172 A | 4/2012 |
| EP | 2076066 B1 | 7/2013 |

OTHER PUBLICATIONS

Huawei et al., 'Open issues on system infromation azquisition in felICIC', R2-123934, 3GPP TSG-RAN2#79 meeting, Qingdao, China, Aug. 12-18, 2012 (http://3gpp.org/ftp/tsg_ran/WG2_RL2/TSGR2_79/Docs/R2-123934.zip) See pp. 1-5; and table 1.

Samsung, 'RRC signalling suooirt for SIB-1 acquisition in FEICIC', R2-123582, 3GPP TSG-RAN2#79 meeting, Qingdao, China, Aug. 12-18, 2012 (http://3gpp.org/ftp/tsg_ran/WG2_RL2-TSGR2_79/Docs/R2-123582.zip) See pp. 1-3.

NTT Docomo Inc., 'Clarification on ETWS reception', R2-123671, 3GPP TSG-RAN2 #79 meeting, Qingdao, China, Aug. 12-18, 2012 (http://3gpp.org/ftp/tsg_ran/WG2_RL2/WG2_RL2/TSGR2_79/Docs/R2-123671.zip) See pp. 1-5.

"LTE; Evolved Universal Terrestrial Radio Access (E-UTRA); Radio Resource Control (RRC); Protocol specification (3GPP TS 63.331 version 10.6.0 Release 10)"; Technical Specification, 20120707 European Telecommunications Standards Institute (ETSI), 650, route des Lucioles; F-06921 Sophia-Antipolis; France; vol. 3GPP RAN 2, Nr.V10.6.0; XP014070533.

ZTE Corporation: "SIB1 Detection in felCIC"; 3GPP TSG-RAN2 #79 meeting; R2-123411, Aug. 13-17, 2012.

Huawei, HiSilicon: "Open issues on system information acquisition in felCIC", 3GPP TSG-Ran WG2 Meeting #79, R2-123934, Aug. 13-17, 2012.

\* cited by examiner

METHOD AND APPARATUS FOR RECEIVING SYSTEM INFORMATION IN WIRELESS COMMUNICATION SYSTEM

This application is a 35 USC § 371 National Stage entry of International Application No. PCT/KR2013/008408 filed on Sep. 17, 2013, and claims priority to US Provisional Application Nos. 61/703,253 filed on Sep. 19, 2012, 61/705,143 filed on Sep. 25, 2012, all of which are hereby incorporated by reference in their entireties as if fully set forth herein.

BACKGROUND OF THE INVENTION

Field of the Invention

The present invention relates to wireless communications, and more particularly, to a method and apparatus for receiving system information in a wireless communication system.

Related Art

Universal mobile telecommunications system (UMTS) is a 3rd generation (3G) asynchronous mobile communication system operating in wideband code division multiple access (WCDMA) based on European systems, global system for mobile communications (GSM) and general packet radio services (GPRS). A long-term evolution (LTE) of UMTS is under discussion by the 3rd generation partnership project (3GPP) that standardized UMTS.

Inter-cell interference coordination (ICIC) has the task to manage radio resources such that inter-cell interference is kept under control. ICIC mechanism includes a frequency domain component and time domain component. ICIC is inherently a multi-cell radio resource management (RRM) function that needs to take into account information (e.g. the resource usage status and traffic load situation) from multiple cells. The preferred ICIC method may be different in the uplink and downlink.

The frequency domain ICIC manages radio resource, notably the radio resource blocks, such that multiple cells coordinate use of frequency domain resources.

For the time domain ICIC, subframe utilization across different cells are coordinated in time through backhaul signaling or operation, administration, and maintenance (OAM) configuration of so called almost blank subframe (ABS) patterns. The ABSs in an aggressor cell are used to protect resources in subframes in the victim cell receiving strong inter-cell interference. ABSs are subframes with reduced transmit power (including no transmission) on some physical channels and/or reduced activity. The eNB ensures backwards compatibility towards UEs by transmitting necessary control channels and physical signals as well as system information. Patterns based on ABSs are signaled to the UE to restrict the UE measurement to specific subframes, called measurement resource restrictions. There are different patterns depending on the type of measured cell (serving or neighbor cell) and measurement type (e.g. RRM, radio link monitoring (RLM)). Multicast-broadcast single frequency network (MBSFN) subframes can be used for time domain ICIC when they are also included in ABS patterns. The eNB cannot configure MBSFN subframes as ABSs when these MBSFN subframes are used for other usages (e.g., multimedia broadcast multicast service (MBMS), location service (LCS)).

ICIC is located in the eNB.

When ICIC is configured, a method for receiving system information efficiently may be required.

SUMMARY OF THE INVENTION

The present invention provides a method for receiving system information in a wireless communication system. The present invention provides a method for receiving a system information modification on a user equipment (UE)-dedicated channel. The present invention also provides a method for receiving a public warning system (PWS) indication on a UE-dedicated channel.

In an aspect, a method for receiving, by a user equipment (UE), system information in a wireless communication system is provided. The method includes receiving a system information modification from an eNodeB (eNB) on a UE-dedicated channel via a radio resource control (RRC) connection reconfiguration message, and receiving at least one system information block from the enB according to system information modification.

The system information modification may include a value tag indicating modification of system information.

The system information modification may be included in a system information block type 1 (SIB1) in the RRC connection reconfiguration message.

The UE-dedicated channel may be a dedicated control channel (DCCH).

The at least one system information block may be received on a broadcast channel.

The at least one system information block may be received in a next modification period.

The at least one system information block may be received from a boundary of a modification period where the system information modification is received.

The UE may be in an RRC connected state.

In another aspect, a method for receiving, by a user equipment (UE), a public warning system (PWS) message in a wireless communication system is provided. The method includes receiving indication of warning message delivery from an eNodeB (eNB) on a UE-dedicated channel via a radio resource control (RRC) connection reconfiguration message, and receiving at least one warning message from the enB according to indication of warning message delivery.

The at least warning message may be received on a broadcast channel.

The at least warning message may be one of an earthquake and tsunami warning system (EWTS) message, a commercial mobile alert system (CMAS) message, a Korean public alert system (KPAS) message, and a EU-Alert message.

In another aspect, a method for receiving, by a user equipment (UE), a paging record in a wireless communication system is provided. The method includes receiving a paging record, including an identity of the UE, from an eNodeB (eNB) on a UE-dedicated channel via a radio resource control (RRC) connection reconfiguration message, and transmitting a paging response message as a response to the paging record.

System information can be received reliably.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3$^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
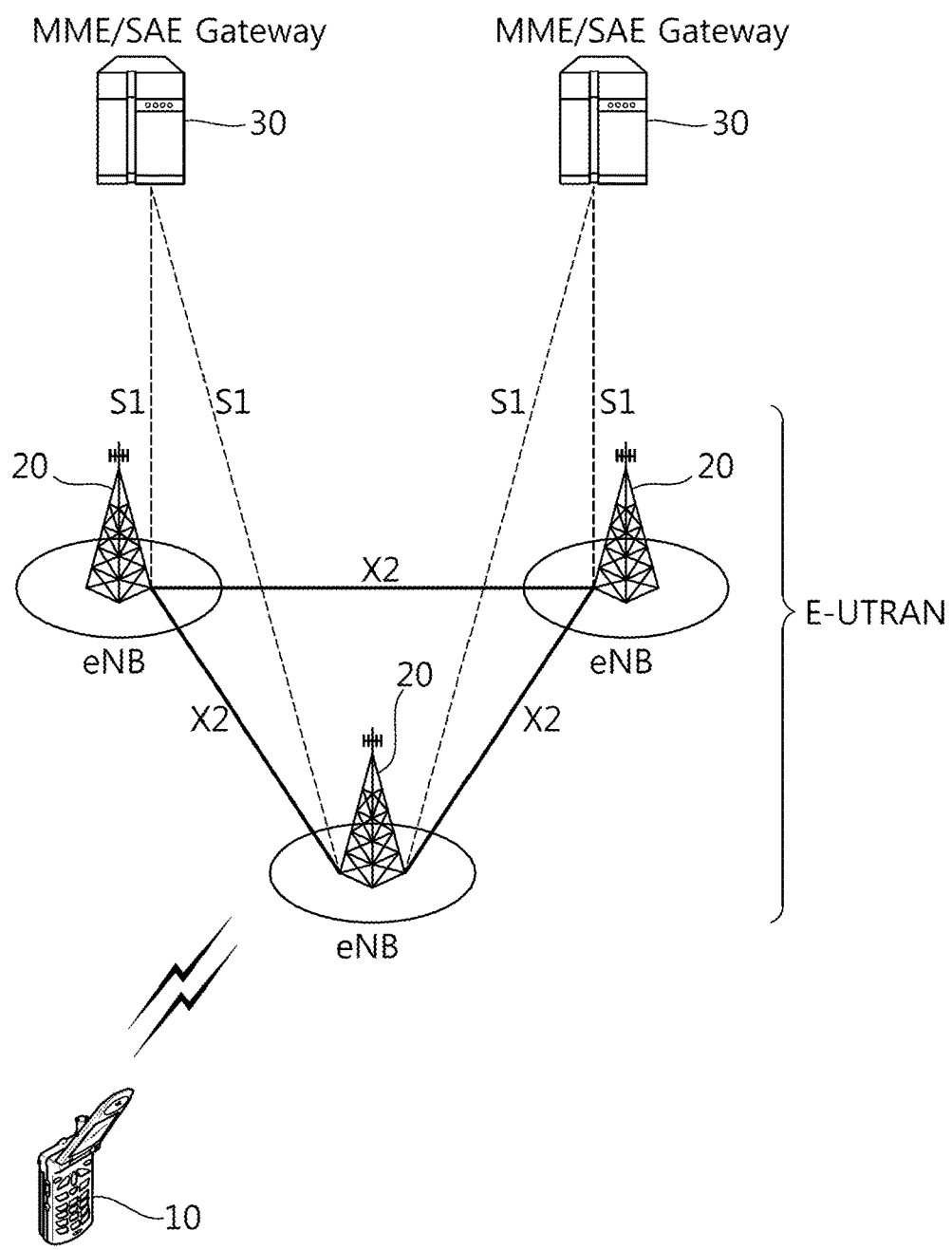
FIG. 1 shows a structure of a wireless communication system.

FIG. 1 shows a structure of a wireless communication system.

The structure of FIG. 1 is an example of a network structure of an evolved-UMTS terrestrial radio access network (E-UTRAN). An E-UTRAN system may be a 3GPP LTE/LTE-A system. An evolved-UMTS terrestrial radio access network (E-UTRAN) includes a user equipment (UE) 10 and a base station (BS) 20 which provides a control plane and a user plane to the UE. The user equipment (UE) 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to as another terminology, such as an evolved node-B (eNB), a base transceiver system (BTS), an access point, etc. There are one or more cells within the coverage of the BS 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Interfaces for transmitting user traffic or control traffic may be used between the BSs 20. The BSs 20 are interconnected by means of an X2 interface. The BSs 20 are connected to an evolved packet core (EPC) by means of an S1 interface. The EPC may consist of a mobility management entity (MME) 30, a serving gateway (S-GW), and a packet data network (PDN) gateway (PDN-GW). The MME has UE access information or UE capability information, and such information may be primarily used in UE mobility management. The S-GW is a gateway of which an endpoint is an E-UTRAN. The PDN-GW is a gateway of which an endpoint is a PDN. The BSs 20 are connected to the MME 30 by means of an S1-MME, and are connected to the S-GW by means of S1-U. The S1 interface supports a many-to-many relation between the BS 20 and the MME/S-GW 30.

Hereinafter, a downlink (DL) denotes communication from the BS 20 to the UE 10, and an uplink (UL) denotes communication from the UE 10 to the BS 20. In the DL, a transmitter may be a part of the BS 20, and a receiver may be a part of the UE 10. In the UL, the transmitter may be a part of the UE 10, and the receiver may be a part of the BS 20.

Figure 2:
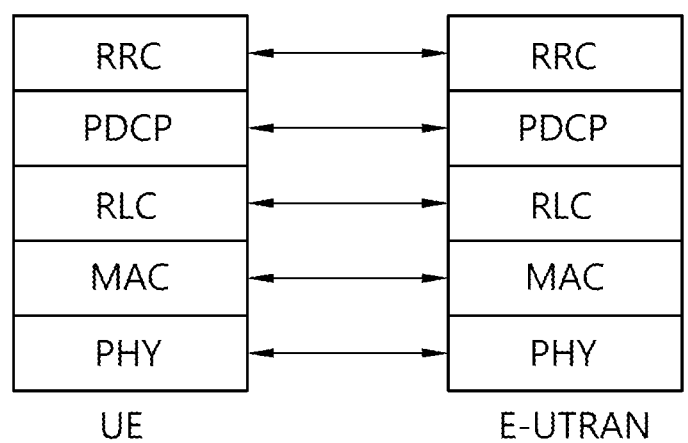
FIG. 2 is a diagram showing radio interface protocol architecture for a control plane.
Figure 3:
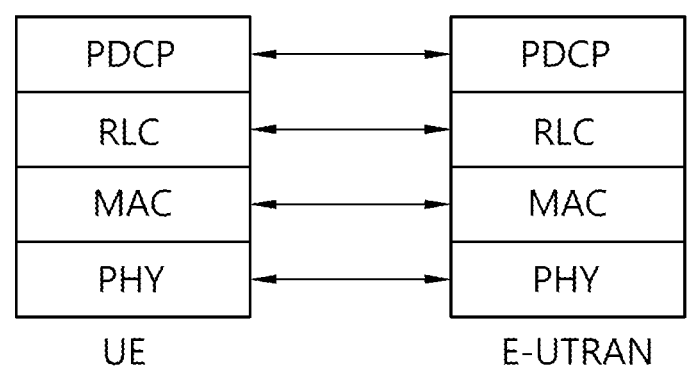
FIG. 3 is a diagram showing radio interface protocol architecture for a user plane.

FIG. 2 is a diagram showing radio interface protocol architecture for a control plane. FIG. 3 is a diagram showing radio interface protocol architecture for a user plane.

Layers of a radio interface protocol between the UE and the E-UTRAN can be classified into a first layer (L1), a second layer (L2), and a third layer (L3) based on the lower three layers of the open system interconnection (OSI) model that is well-known in the communication system. The radio interface protocol between the UE and the E-UTRAN can be horizontally divided into a physical layer, a data link layer, and a network layer, and can be vertically divided into a control plane which is a protocol stack for control signal transmission and a user plane which is a protocol stack for data information transmission. The layers of the radio interface protocol exist in pairs at the UE and the E-UTRAN.

A physical (PHY) layer belonging to the L1 provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transmitted through a radio interface. Between different PHY layers, i.e., a PHY layer of a transmitter and a PHY layer of a receiver, data is transferred through the physical channel. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH can carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ ACK/NACK signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

Figure 4:
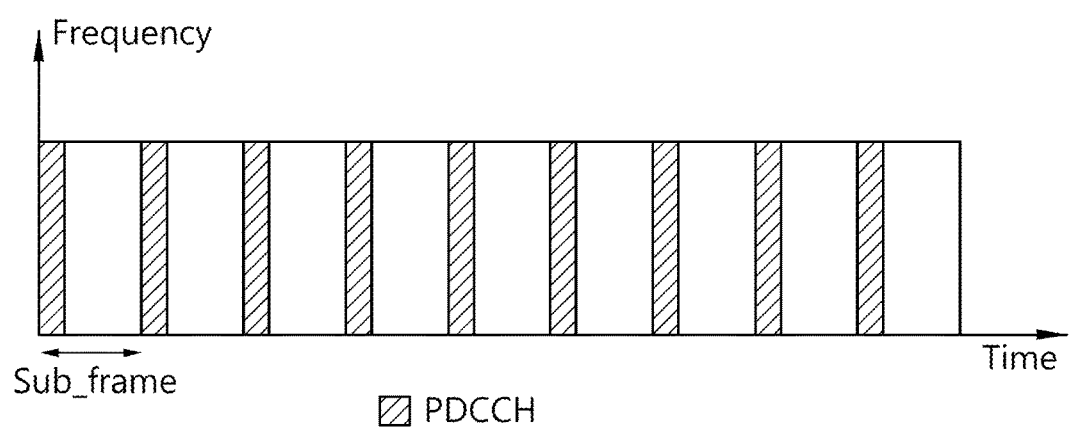
FIG. 4 shows an example of a physical channel structure.

FIG. 4 shows an example of a physical channel structure.

A physical channel consists of a plurality of subframes in a time domain and a plurality of subcarriers in a frequency domain. One subframe consists of a plurality of symbols in the time domain. One subframe consists of a plurality of resource blocks (RBs). One RB consists of a plurality of symbols and a plurality of subcarriers. In addition, each subframe can use specific subcarriers of specific symbols of a corresponding subframe for a PDCCH. For example, a first symbol of the subframe can be used for the PDCCH. A transmission time interval (TTI) which is a unit time for data transmission may be equal to a length of one subframe.

A DL transport channel for transmitting data from the network to the UE includes a broadcast channel (BCH) for transmitting system information, a paging channel (PCH) for transmitting a paging message, a DL-SCH for transmitting user traffic or control signals, etc. The system information carries one or more system information blocks. All system information blocks can be transmitted with the same periodicity. Traffic or control signals of a multimedia broadcast/multicast service (MBMS) are transmitted through a multicast channel (MCH). Meanwhile, a UL transport channel for transmitting data from the UE to the network includes a random access channel (RACH) for transmitting an initial control message, a UL-SCH for transmitting user traffic or control signals, etc.

A MAC layer belonging to the L2 provides a service to a higher layer, i.e., a radio link control (RLC), through a logical channel. A function of the MAC layer includes mapping between the logical channel and the transport channel and multiplexing/de-multiplexing for a transport block provided to a physical channel on a transport channel of a MAC service data unit (SDU) belonging to the logical channel. The logical channel is located above the transport channel, and is mapped to the transport channel. The logical channel can be divided into a control channel for delivering control region information and a traffic channel for delivering user region information. The logical includes a broadcast control channel (BCCH), a paging control channel (PCCH), a common control channel (CCCH), a multicast control channel (MCCH), a multicast traffic channel (MTCH), etc.

An RLC layer belonging to the L2 supports reliable data transmission. A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ). Meanwhile, a function of the RLC layer can be implemented with a functional block inside the MAC layer. In this case, the RLC layer may not exist.

A packet data convergence protocol (PDCP) layer belongs to the L2. A function of a packet data convergence protocol (PDCP) layer in the user plane includes user data delivery, header compression, and ciphering. The header compression has a function for decreasing a size of an IP packet header which contains relatively large-sized and unnecessary control information, to support effective transmission in a radio section having a narrow bandwidth. A function of a PDCP layer in the control plane includes control-plane data delivery and ciphering/integrity protection.

A radio resource control (RRC) layer belonging to the L3 is defined only in the control plane. The RRC layer takes a role of controlling a radio resource between the UE and the network. For this, the UE and the network exchange an RRC message through the RRC layer. The RRC layer serves to control the logical channel, the transport channel, and the physical channel in association with configuration, reconfiguration, and release of RBs. An RB is a logical path provided by the L2 for data delivery between the UE and the network. The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

An RRC state indicates whether an RRC of a user equipment (UE) is logically connected to an RRC of an E-UTRAN. When an RRC connection is established between an RRC layer of the UE and an RRC layer of the E-UTRAN, the UE is in an RRC connected state (RRC_CONNECTED), and otherwise the UE is in an RRC idle state (RRC_IDLE). Since the UE in RRC_CONNECTED has the RRC connection established with the E-UTRAN, the E-UTRAN can recognize the existence of the UE in RRC_CONNECTED and can effectively control the UE. Meanwhile, the UE in RRC_IDLE cannot be recognized by the E-UTRAN, and a core network (CN) manages the UE in unit of a tracking area (TA) which is a larger area than a cell. That is, only the existence of the UE in RRC_IDLE is recognized in unit of a large area, and the UE must transition to RRC_CONNECTED to receive a typical mobile communication service such as voice or data communication.

When the user initially powers on the UE, the UE first searches for a proper cell and then remains in RRC_IDLE in the cell. When there is a need to establish an RRC connection, the UE which remains in RRC_IDLE may establish the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

The UE which remains in RRC_IDLE can persistently perform cell reselection to find a better cell. In this case, the UE can perform measurement and cell reselection by using frequency priority information. That is, the UE can determine which frequency will be preferentially considered when performing frequency measurement and cell reselection on the basis of the frequency priority information. The UE can receive the frequency priority information by using system information or an RRC connection release message, or can receive the frequency priority information from another radio access technology (RAT) in inter-RAT cell reselection.

Figure 5:
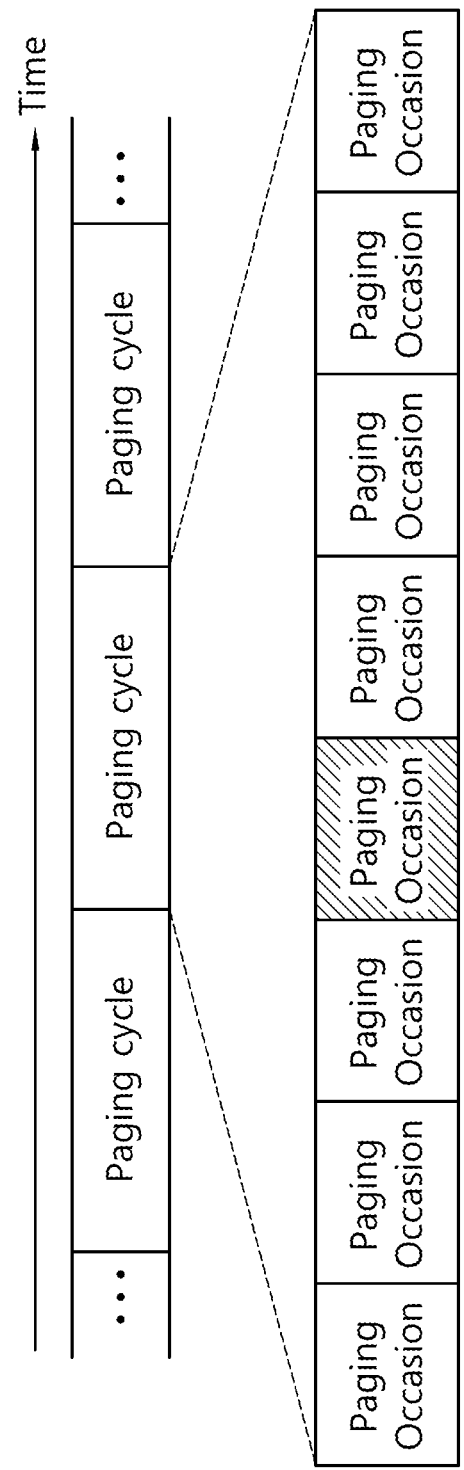
FIG. 5 shows transmission of a paging channel.

FIG. 5 shows transmission of a paging channel.

When there is data to be transmitted by a network to a specific UE or a call delivered to the specific UE, the paging message is used to search and wake up the UE. To transmit a cell and defines scheduling of other SIBs. Other SIBs are sets of related system information. For example, a specific SIB may include only information of a neighbor cell, and another SIB may include only information of an uplink radio channel used by the UE.

Table 1 shows an example of a part of the SystemInformationBlockType1 message.

TABLE 1

```
-- ASN1START
SystemInformationBlockType1 ::=   SEQUENCE {
    cellAccessRelatedInfo                SEQUENCE {
        plmn-IdentityList                    PLMN-IdentityList,
        trackingAreaCode                     TrackingAreaCode,
        cellIdentity                         CellIdentity,
        cellBarred                               ENUMERATED {barred, notBarred},
        intraFreqReselection                 ENUMERATED {allowed, notAllowed},
        csg-Indication                       BOOLEAN,
        csg-Identity                                                     CSG-Identity
OPTIONAL        -- Need OR
    },
    cellSelectionInfo                    SEQUENCE {
        q-RxLevMin                               Q-RxLevMin,
        q-RxLevMinOffset                                 INTEGER   (1..8)
OPTIONAL        -- Need OP
    },
    p-Max                                                                P-Max
OPTIONAL,       -- Need OP
    freqBandIndicator                    FreqBandIndicator,
    schedulingInfoList                   SchedulingInfoList,
    tdd-Config                                                           TDD-Config
OPTIONAL,   -- Cond TDD
    si-WindowLength                          ENUMERATED {
                                                ms1, ms2, ms5, ms10, ms15, ms20, ms40},
    systemInfoValueTag                       INTEGER (0..31),
    nonCriticalExtension                             SystemInformationBlockType1-v890-IEs
OPTIONAL
}
...
--ASN1STOP
``` the paging message, an E-UTRAN may search for a certain location area in which the UE is currently located, and may transmit the paging message through one cell belonging to the location area in which the UE is located. For this, whenever there is a change in the location area, the UE may report the change to the network, which is called a location area update procedure.

Referring to FIG. 5, a plurality of paging cycles is configured, and one paging cycle may include a plurality of paging occasions. When receiving the paging message, the UE may perform discontinuous reception (DRX) to decrease power consumption. For this, the network may configure a plurality of paging occasions for every time period called a paging cycle, and a specific UE may receive the paging message by monitoring a paging channel only during a specific paging occasion. The UE does not monitor the paging channel in a time other than the specific paging occasion assigned to the UE. One paging occasion may correspond to one TTI.

System information is described below. It may be referred to Section 5.2 of 3GPP TS 36.331 V11.0.0 (2012-06).

System information is divided into a MasterInformationBlock (MIB) and a number of SystemInformationBlocks (SIBs). The MIB defines the most essential physical layer information of a cell required to receive further system information. SystemInformationBlockType1 contains information relevant when evaluating if a UE is allowed to access The MIB is mapped on a BCCH and carried on a BCH while all SIBs are mapped on the BCCH and dynamically carried on a DL-SCH where they can be identified through an SI-RNTI (system information radio network temporary identifier). The MIB uses a fixed schedule with a periodicity of 40 ms and repetitions made within 40 ms. The first transmission of the MIB is scheduled in subframe #0 of radio frames for which the SFN mod 4=0, and repetitions are scheduled in subframe #0 of all other radio frames.

The SystemInformationBlockType1 uses a fixed schedule with a periodicity of 80 ms and repetitions made within 80 ms. The first transmission of the SystemInformationBlockType1 is scheduled in subframe #5 of radio frames for which the SFN mod 8=0, and repetitions are scheduled in subframe #5 of all other radio frames for which SFN mod 2=0. A single SI-RNTI is used to address the SystemInformationBlockType1 as well as all other SIBs. The SystemInformationBlockType1 configures an SI-window length and the transmission periodicity for all other SIBs, as described in Table 1.

Scheduling of all other SIBs is flexible and indicated by the SystemInformationBlockType1. The SIBs are transmitted within periodically occurring SI-windows using dynamic scheduling. Each SIB is associated with a SI-window, and SI-windows of different SIBs do not overlap. That is, within one SI-window only the corresponding SIB is transmitted. The length of the SI-window is common for all SIBs, and is configurable. Within the SI-window, the corresponding SIB can be transmitted a number of times in any subframe other than Multicast-Broadcast Single Frequency Network (MBSFN) subframes, uplink subframes in time domain duplex (TDD), and subframe #5 of radio frames for which SFN mod 2=0. The UE acquires the detailed time-domain scheduling (and other information, e.g. frequency-domain scheduling, used transport format) from decoding an SI-RNTI on a PDCCH.

The eNB may schedule DL-SCH transmissions concerning logical channels other than BCCH in the same subframe as used for the BCCH. The minimum UE capability restricts the BCCH mapped to DL-SCH e.g. regarding the maximum rate. System information may also be provided to the UE by means of dedicated signaling e.g. upon handover.

Change of system information only occurs at specific radio frames, i.e. concept of a modification period is used. System information may be transmitted a number of times with the same content within a modification period, as defined by its scheduling. The modification period boundaries are defined by SFN values for which SFN mod m=0, where m is the number of radio frames comprising the modification period. The modification period is configured by system information.

Figure 6:
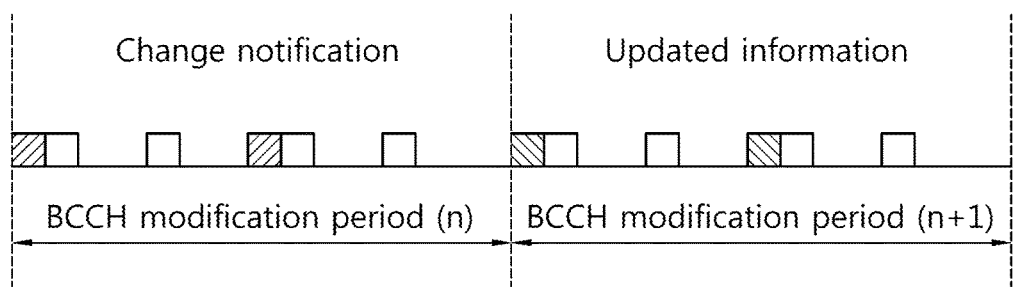
FIG. 6 shows a change of change of system information.

FIG. 6 shows a change of change of system information.

When a network changes (some of the) system information, it first notifies UEs about this change, i.e. this may be done throughout a modification period. In the next modification period, the network transmits updated system information. Referring to FIG. 6, different hatchings indicate different system information. Upon receiving a change notification, the UE acquires new system information immediately from the start of the next modification period. The UE applies the previously acquired system information until the UE acquires the new system information.

A paging message is used to inform UEs in RRC_IDLE and UEs in RRC_CONNECTED about a system information change. If the UE receives a paging message including systemInfoModification, it knows that the system information will change at the next modification period boundary. Although the UE may be informed about changes in the system information, no further details are provided e.g. regarding which system information will change.

The SystemInformationBlockType1 includes a value tag, systemInfoValueTag, that indicates if a change has occurred in the system information, as described in Table 1. The UE may use systemInfoValueTag, e.g. upon return from out of coverage, to verify if the previously stored system information is still valid. Additionally, the UE considers the stored system information to be invalid after 3 hours from the moment it was successfully confirmed as valid, unless specified otherwise.

The UE verifies that the stored system information remains valid by either checking systemInfoValueTag in the SystemInformationBlockType1 after the modification period boundary, or attempting to find systemInfoModification indication at least modificationPeriodCoeff times during the modification period in case no paging message is received, in every modification period. If no paging message is received by the UE during a modification period, the UE may assume that no change of the system information will occur at the next modification period boundary. If the UE in RRC_CONNECTED, during the modification period, receives one paging message, it may deduce from the presence/absence of systemInfoModification whether a change of the system information will occur in the next modification period or not.

Figure 7:
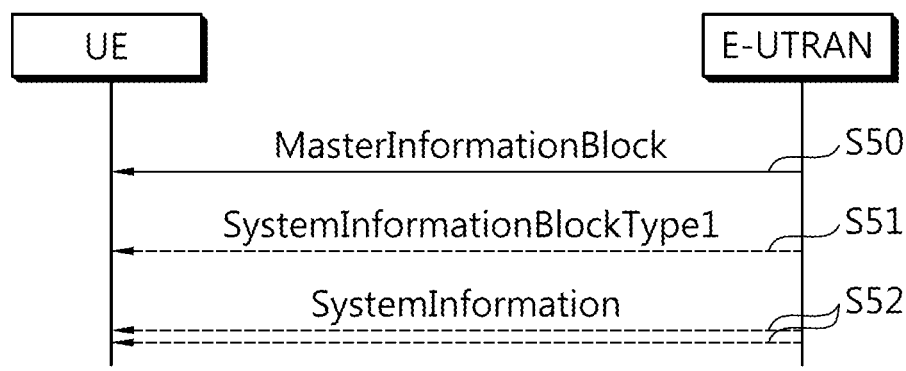
FIG. 7 shows a system information acquisition procedure.

FIG. 7 shows a system information acquisition procedure.

A UE applies a system information acquisition procedure to acquire an access stratum (AS)- and non-access stratum (NAS)-system information that is broadcasted by an E-UTRAN. The system information acquisition procedure applies to UEs in RRC_IDLE and UEs in RRC_CONNECTED.

Referring to FIG. 7, at step S50, a UE receives a MIB from an E-UTRAN. At step S51, the UE receives a SystemInformationBlockType1 from the E-UTRAN. At step S52, the UE receives system information from the E-UTRAN.

Generally, an MIB may be transmitted using relatively narrow bandwidth while all other SIBs may be transmitted using relatively wide bandwidth. For example, an MIB may be transmitted through 3 MHz bandwidth among 20 MHz bandwidth of a cell, while all other SIBs may be transmitted through whole 20 MHz of the cell.

Figure 8:
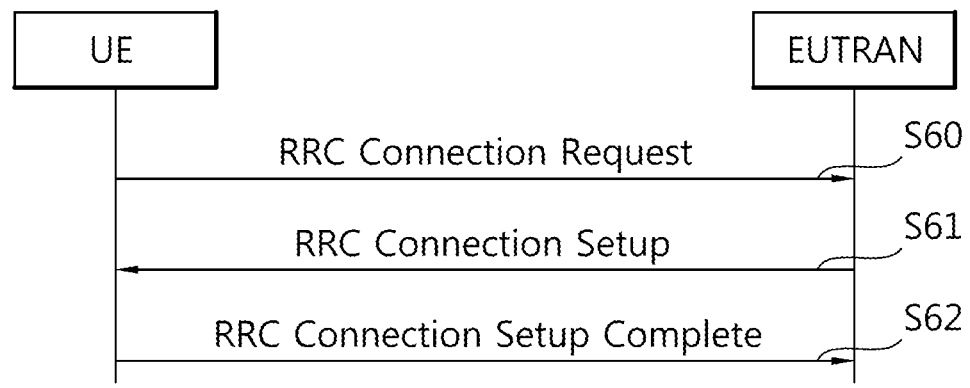
FIG. 8 shows an RRC connection establishment procedure.

FIG. 8 shows an RRC connection establishment procedure. It may be referred to Section 5.3.3 of 3GPP TS 36.331 V11.0.0 (2012-06). The purpose of this procedure is to establish an RRC connection. The RRC connection establishment may involve SRB1 establishment. The RRC connection establishment procedure is also used to transfer the initial NAS dedicated information/message from the UE to the E-UTRAN. The E-UTRAN may apply the RRC connection establishment procedure to establish SRB1 only.

Referring to FIG. 8, at step S60, the UE transmits an RRC connection request (RRCConnectionRequest) message to the E-UTRAN. At step S61, the E-UTRAN transmits an RRC connection setup (RRCConnectionSetup) message to the UE. At step S62, the UE transmits an RRC connection setup complete (RRCConnectionSetupComplete) message to the E-UTRAN.

Figure 9:
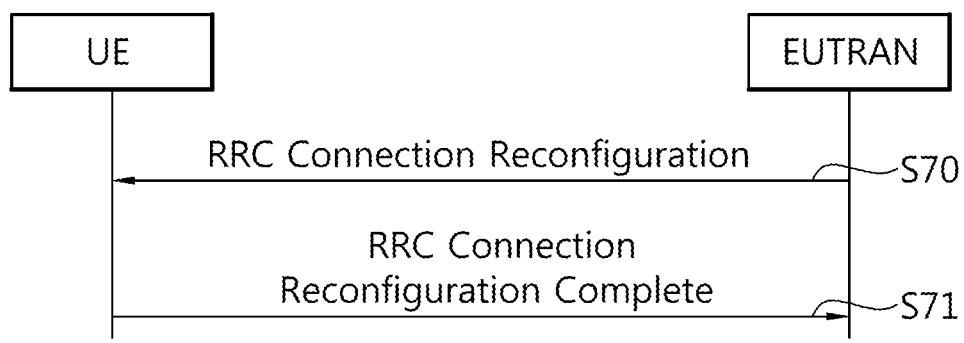
FIG. 9 shows an RRC connection reconfiguration procedure.

FIG. 9 shows an RRC connection reconfiguration procedure. It may be referred to Section 5.3.5 of 3GPP TS 36.331 V11.0.0 (2012-06). The purpose of this procedure is to modify an RRC connection, e.g. to establish/modify/release RBs, to perform handover, to setup/modify/release measurements, to add/modify/release secondary cells (SCells). As part of the RRC connection reconfiguration procedure, NAS dedicated information may be transferred from the E-UTRAN to the UE.

Referring to FIG. 9, at step S70, the E-UTRAN transmits an RRC connection reconfiguration (RRCConnectionReconfiguration) message to the UE. At step S71, the UE transmits an RRC connection reconfiguration complete (RRCConnectionReconfigurationComplete) message to the E-UTRAN.

Table 2 shows an example of RRCConnectionReconfiguration message. The RRCConnectionReconfiguration message is the command to modify an RRC connection. It may convey information for measurement configuration, mobility control, radio resource configuration (including RBs, MAC main configuration and physical channel configuration) including any associated dedicated NAS information and security configuration.

TABLE 2

```
-- ASN1START
RRCConnectionReconfiguration ::=         SEQUENCE {
    rrc-TransactionIdentifier                RRC-TransactionIdentifier,
    criticalExtensions                       CHOICE {
        c1                                       CHOICE{
            rrcConnectionReconfiguration-r8          RRCConnectionReconfiguration-r8-IEs,
            spare7 NULL,
            spare6 NULL, spare5 NULL, spare4 NULL,
            spare3 NULL, spare2 NULL, spare1 NULL
        },
        criticalExtensionsFuture                 SEQUENCE { }
    }
}
RRCConnectionReconfiguration-r8-IEs ::= SEQUENCE {
    measConfig                               MeasConfig                             OPTIONAL, -- Need ON
    mobilityControlInfo                      MobilityControlInfo                    OPTIONAL, -- Cond HO
    dedicatedInfoNASList                     SEQUENCE (SIZE(1..maxDRB)) OF
                                                 DedicatedInfoNAS                   OPTIONAL, -- Cond nonHO
    radioResourceConfigDedicated             RadioResourceConfigDedicated           OPTIONAL, -- Cond HO-toEUTRA
    securityConfigHO                         SecurityConfigHO                       OPTIONAL, -- Cond HO
    nonCriticalExtension                     RRCConnectionReconfiguration-v890-IEs  OPTIONAL
}
RRCConnectionReconfiguration-v890-IEs ::= SEQUENCE {
    lateNonCriticalExtension                 OCTET STRING                           OPTIONAL, -- Need OP
    nonCriticalExtension                     RRCConnectionReconfiguration-v920-IEs  OPTIONAL
}
RRCConnectionReconfiguration- v920-IEs ::= SEQUENCE {
    otherConfig-r9                           OtherConfig-r9                         OPTIONAL, -- Need ON
    fullConfig-r9                            ENUMERATED  {true}                     OPTIONAL, -- Cond HO-Reestab
    nonCriticalExtension                     RRCConnectionReconfiguration-v1020-IEs OPTIONAL
}
RRCConnectionReconfiguration-v1020-IEs ::= SEQUENCE {
    sCellToReleaseList-r10                   SCellToReleaseList-r10                 OPTIONAL, -- Need ON
    sCellToAddModList-r10                    SCellToAddModList-r10                  OPTIONAL, -- Need ON
    nonCriticalExtension                     SEQUENCE  { }                          OPTIONAL -- Need OP
}
...
--ASN1STOP
```

Inter-cell interference coordination (ICIC) is described below. It may be referred to Section 16.1.5 of 3GPP TS 36.300 V11.2.0 (2012-06).

For the UE to measure "protected" resources of the serving cell and/or neighbor cells, radio resource management (RRM)/radio link monitoring (RLM)/channel state information (CSI) measurement resource restriction is signaled to the UE. There are three kinds of measurement resource restriction patterns that may be configured for the UE.

Pattern 1: A single RRM/RLM measurement resource restriction for the primary cell (PCell).

Pattern 2: A single RRM measurement resource restriction for all or indicated list of neighbor cells operating in the same carrier frequency as the PCell.

Pattern 3: Resource restriction for CSI measurement of the PCell. If configured, two subframe subsets are configured per UE. The UE reports CSI for each configured subframe subset.

For pattern 3, it is up to the network to choose the two subframe subsets but typically the two subframe subsets are chosen with the expectation that CSI measurements using the two configured subframe subsets are subject to different levels of interference (e.g. one subframe subset indicates almost blank subframes (ABSs) while the second subframe subset indicates non-ABSs).

In RRC_CONNECTED, the RRM/RLM/CSI measurement resource restrictions are configured by dedicated RRC signaling.

Operation, administration, and maintenance (OAM) requirements for time domain ICIC is configured as followings:

1) Configuration for Closed Subscriber Group (CSG) Cell

When the time-domain ICIC is used for non-members UE in close proximity of a CSG cell, OAM configures a CSG cell not to use a time domain resource set (i.e. a set of subframes), so that a non-member UE in close proximity of the CSG cell can be still served by another cell. OAM also configures a cell neighbor to a CSG cell with the protected time domain resource set not used by the CSG cell, so that the neighbor cell knows which time domain resource can be used for a non-member UE in close proximity of the CSG cell.

2) Configuration for Interfering Non-CSG Cell

When the time-domain ICIC is used to mitigate interference between two cells using X2 signaling of ABS patterns from an interfering eNB to an interfered eNB, the following OAM requirements are applied.

OAM may configure association between eNBs to use the time-domain ICIC.

For the deployment scenarios where common subset for ABS patterns from multiple interfering cells is desirable, OAM configuration ensures that a 'common subset' exists between the ABS patterns of those interfering cells.

Time domain ICIC deployment scenarios are described. Two scenarios have been identified where conventional ICIC techniques are insufficient to overcome co-channel interference, the CSG scenario and the pico scenario. The identified scenarios are examples of network configurations that are intended to depict the basic concept of time domain ICIC and it should be understood that other network deployment scenarios are also possible.

Figure 10:
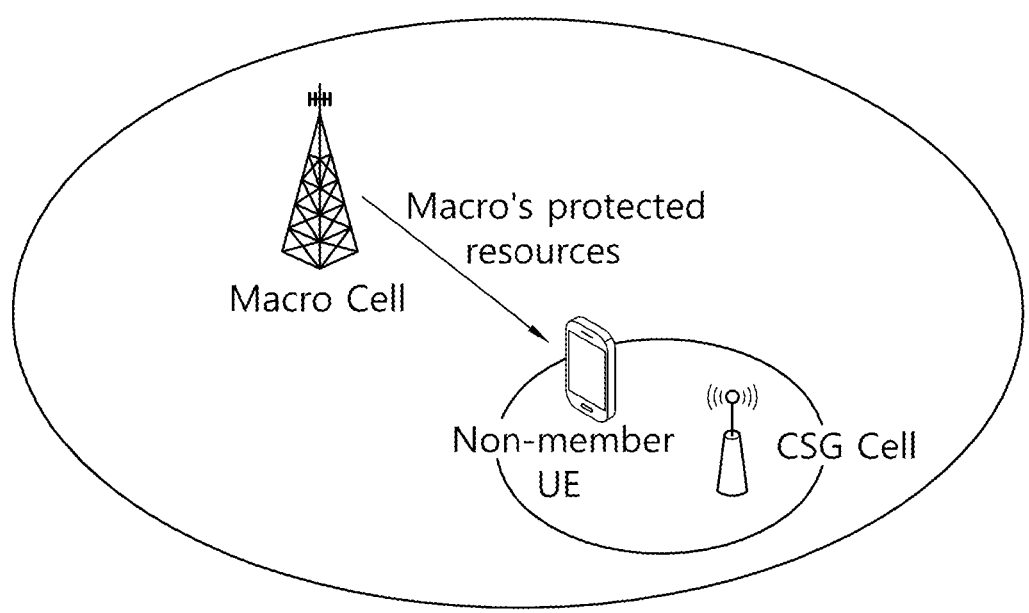
FIG. 10 shows an example of a CSG scenario of a time domain ICIC deployment scenario.

FIG. 10 shows an example of a CSG scenario of a time domain ICIC deployment scenario.

Dominant interference condition may happen when non-member users are in close proximity of a CSG cell. Depending on network deployment and strategy, it may not be possible to divert the users suffering from inter-cell interference to another E-UTRA carrier or other radio access technology (RAT). Time domain ICIC may be used to allow such non-member UEs to remain served by the macro cell on the same frequency layer.

Such interference may be mitigated by the CSG cell utilizing ABSs to protect the corresponding macro cell's subframes from the interference. A non-member UE may be signaled to utilize the protected resources for RRM, RLM and CSI measurements for the serving macro cell, allowing the UE to continue to be served by the macro cell under strong interference from the CSG cell.

In RRC_CONNECTED, the network can find out that the UE is subject to dominant interference from a CSG cell which the UE is not a member of through the existing measurement events, at which point the network may choose to configure the RRM/RLM/CSI measurement resource restriction for the UE. The network may also configure RRM measurement resource restriction for neighbor cells in order to facilitate mobility from the serving macro cell. The network may release the RRM/RLM/CSI measurement resource restriction when it detects that the UE is no longer severely interfered by the CSG cell.

Figure 11:
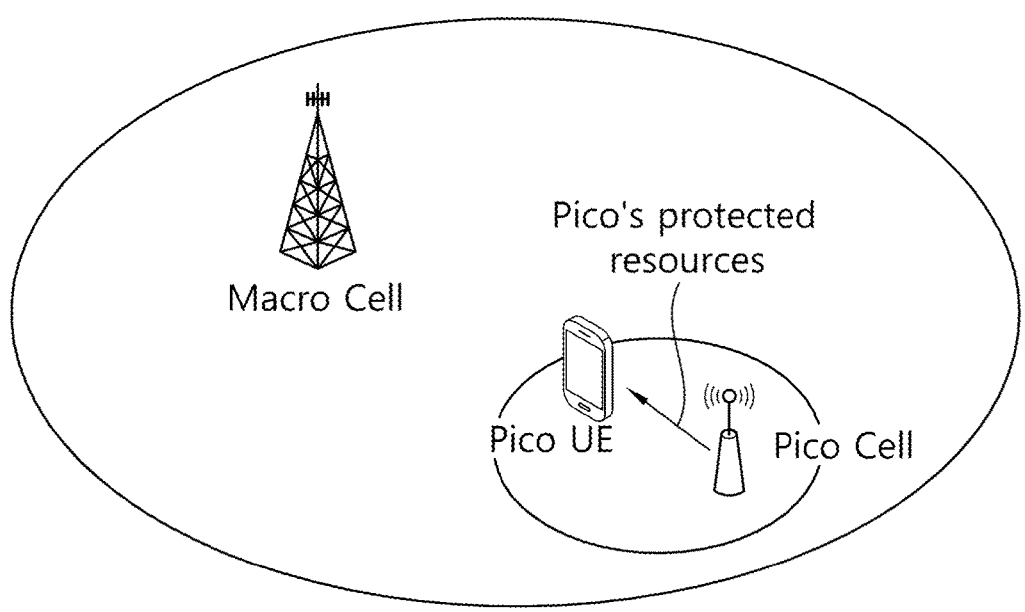
FIG. 11 shows an example of a pico scenario of a time domain ICIC deployment scenario.

FIG. 11 shows an example of a pico scenario of a time domain ICIC deployment scenario.

Time domain ICIC may be utilized for pico users who served in the edge of the serving pico cell, e.g. for traffic off-loading from a macro cell to a pico cell. Time domain ICIC may be utilized to allow such UEs to remain served by the pico cell on the same frequency layer.

Such interference may be mitigated by the macro cell(s) utilizing ABSs to protect the corresponding pico cell's subframes from the interference. A UE served by a pico cell uses the protected resources for RRM, RLM and CSI measurements for the serving pico cell.

For a UE served by a pico cell, the RRM/RLM/CSI measurement resource restriction may allow more accurate measurement of pico cell under strong interference from the macro cell(s). The pico cell may selectively configure the RRM/RLM/CSI measurement resource restriction only for those UEs subject to strong interference from the macro cell(s). Also, for a UE served by a macro cell, the network may configure RRM measurement resource restriction for neighbor cells in order to facilitate mobility from the macro cell to a pico cell.

Load indication procedure is described. It may be referred to Section 8.3.1 of 3GPP TS 36.423 V11.1.0 (2012-06).

The purpose of the load indication procedure is to transfer load and interference co-ordination information between eNBs controlling intra-frequency neighbor cells.

The procedure uses non UE-associated signaling.

Figure 12:
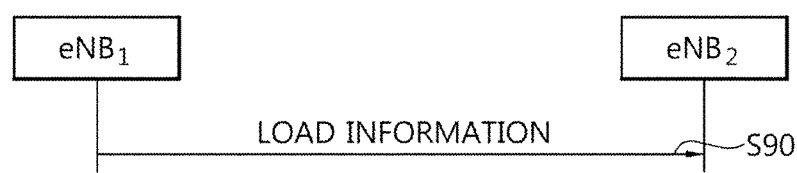
FIG. 12 shows a load indication procedure. At step S90, an eNB1 transmits a load information message to an eNB2.

FIG. 12 shows a load indication procedure. At step S90, an eNB1 transmits a load information message to an eNB2.

An eNB initiates the procedure by sending the load information message to eNBs controlling intra-frequency neighbor cells.

If the UL interference overload indication IE is received in the load information message, it indicates the interference level experienced by the indicated cell on all resource blocks, per physical resource block (PRB). The receiving eNB may take such information into account when setting its scheduling policy and shall consider the received UL interference overload indication IE value valid until reception of a new load information message carrying an update of the same IE.

If the UL high interference indication IE is received in the load information message, it indicates, per PRB, the occurrence of high interference sensitivity, as seen from the sending eNB. The receiving eNB should try to avoid scheduling cell edge UEs in its cells for the concerned PRBs. The target cell ID IE received within the UL high interference information IE group in the load information message indicates the cell for which the corresponding UL high interference indication IE is meant. The receiving eNB shall consider the value of the UL high interference information IE group valid until reception of a new load information message carrying an update.

If the relative narrowband Tx power (RNTP) IE is received in the load information message, it indicates, per PRB, whether downlink transmission power is lower than the value indicated by the RNTP threshold IE. The receiving eNB may take such information into account when setting its scheduling policy and shall consider the received relative narrowband Tx power (RNTP) IE value valid until reception of a new load information message carrying an update.

If the ABS information IE is included in the load information message, the ABS pattern info IE indicates the subframes designated as ABSs by the sending eNB for the purpose of interference coordination. The receiving eNB may take such information into consideration when scheduling UEs.

The receiving eNB may use the measurement subset IE received in the load information message, for the configuration of specific measurements towards the UE.

The receiving eNB shall consider the received information as immediately applicable. The receiving eNB shall consider the value of the ABS information IE valid until reception of a new load information message carrying an update.

If an ABS indicated in the ABS pattern info IE coincides with a multicast-broadcast single frequency network (MB-SFN) subframe, the receiving eNB shall consider that the subframe is designated as ABS by the sending eNB.

If the invoke indication IE is included in the load information message, it indicates which type of information the sending eNB would like the receiving eNB to send back. The receiving eNB may take such request into account.

If the invoke indication IE is set to "ABS Information", it indicates the sending eNB would like the receiving eNB to initiate the load indication procedure, with the load information message containing the ABS information IE indicating non-zero ABS patterns in the relevant cells.

The load information message is sent by an eNB to neighbor eNBs to transfer load and interference co-ordination information. Table 3 and Table 4 show a load information message.

TABLE 3

| IE/Group Name | Presence | Range | IE type and reference | Semantics description | Criticality | Assigned Criticality |
|---|---|---|---|---|---|---|
| Message Type | M | | 9.2.13 | | YES | ignore |
| Cell Information | M | | | | YES | ignore |
| >Cell Information Item | | 1 ... <maxCellineNB> | | | EACH | ignore |
| >>Cell ID | M | | ECGI 9.2.14 | Id of the source cell | — | — |
| >>UL Interference Overload Indication | O | | 9.2.17 | | — | — |
| >>UL High Interference Information | | 0 ... <maxCellineNB> | | | | |
| >>>Target Cell ID | M | | ECGI 9.2.14 | Id of the cell for which the HII is meant | — | — |
| >>>UL High Interference Indication | M | | 9.2.18 | | — | — |
| >>Relative Narrowband Tx Power (RNTP) | O | | 9.2.19 | | — | — |
| >>ABS Information | O | | 9.2.54 | | YES | ignore |
| >>Invoke Indication | O | | 9.2.55 | | YES | ignore |

TABLE 4

| Range bound | Explanation |
|---|---|
| maxCellineNB | Maximum no. cells that can be served by an eNB. Value is 256. |

Table 5 and Table 6 show a UL interference overload indication IE included in the load information message. This IE provides, per PRB, a report on interference overload. The interaction between the indication of UL interference overload and UL high interference is implementation specific.

TABLE 5

| IE/Group Name | Presence | Range | IE type and reference | Semantics description |
|---|---|---|---|---|
| UL Interference Overload Indication List | | 1 ... <maxnoofPRBs> | | |
| >UL Interference Overload Indication | M | | ENUMERATED (high interference, medium interference, low interference, ...) | Each PRB is identified by its position in the list: the first element in the list corresponds to PRB 0, the second to PRB 1, etc. |

TABLE 6

| Range bound | Explanation |
|---|---|
| maxnoofPRBs | Maximum no. Physical Resource Blocks. Value is 110. |

Table 7 shows a UL high interference indication IE included in the load information message. This IE provides, per PRB, a 2 level report on interference sensitivity. The interaction between the indication of UL overload and UL high interference is implementation specific.

TABLE 7

| IE/Group Name | Presence | Range | IE type and reference | Semantics description |
|---|---|---|---|---|
| HII | M | | BIT STRING (1 . . . 110, . . .) | Each position in the bitmap represents a PRB (first bit = PRB 0 and so on), for which value "'1" indicates 'high interference sensitivity' and value "0" indicates 'low interference sensitivity'. The maximum number of Physical Resource Blocks is 110 |

Table 8 shows a relative narrowband TX power (RNTP) IE included in the load information message. This IE provides an indication on DL power restriction per PRB in a cell and other information needed by a neighbor eNB for interference aware scheduling.

and pico cell) by dedicating some specific subframes to a neighbor cell (i.e. ABS in time domain ICIC) or by reducing transmission power of some radio resources from a neighbor cell (i.e. RNTP per PRB).

However, the E-UTRAN may fail to achieve successful interference coordination for transmissions of system information and paging. It is because scheduling of system information and paging messages from neighbor cells would be frequently overlapped in time. Thus, if the UE performs handover from a macro cell to a pico cell and then if the UE falls in coverage range extension (CRE) region of the pico cell, the UE may fail to detect the system information from the pico cell after handover completion. While the UE is within the CRE region of the pico cell, it may also fail to detect the paging messages from the pico cell.

TABLE 8

| IE/Group Name | Presence | Range | IE type and reference | Semantics description | Criticality | Assigned Criticality |
|---|---|---|---|---|---|---|
| RNTP Per PRB | M | | BIT STRING (6 . . . 110, . . .) | Each position in the bitmap represents a $n_{PRB}$ value (i.e. first bit = PRB 0 and so on), for which the bit value represents RNTP $(n_{PRB})$, defined in TS 36.213 [11]. Value 0 indicates "Tx not exceeding RNTP threshold". Value 1 indicates "no promise on the Tx power is given" | — | — |
| RNTP Threshold | M | | ENUMERATED (−∞, −11, −10, −9, −8, −7, −6, −5, −4, −3, −2, −1, 0, 1, 2, 3, . . .) | $RNTP_{threshold}$ is defined in TS 36.213 [11] | — | — |
| Number Of Cell-specific Antenna Ports | M | | ENUMERATED (1, 2, 4, . . .) | P (number of antenna ports for cell-specific reference signals) defined in TS 36.211 [10] | — | — |
| P_B | M | | INTEGER (0 . . . 3, . . .) | $P_B$ is defined in TS 36.213 [11] | — | — |
| PDCCH Interference Impact | M | | INTEGER (0 . . . 4, . . .) | Measured by Predicted Number Of Occupied PDCCH OFDM Symbols (see TS 36.211 [10]). Value 0 means "no prediction is available" | — | — |

According to the prior art, the E-UTRAN performs interference coordination between cells (e.g. between macro cell Moreover, system information modification may not be received since the paging message is used to inform UEs in RRC_IDLE and UEs in RRC_CONNECTED about a system information change. Similarly, a public warning system (PWS) notification or a paging record may not be received since the PWS notification or the paging record is transmitted through the paging message. Therefore, a method for receiving the system information modification, PWS notification, and/or paging record via a UE-dedicated signaling on a UE-dedicated channel, instead of the paging message on a PCCH, may be required.

Figure 13:
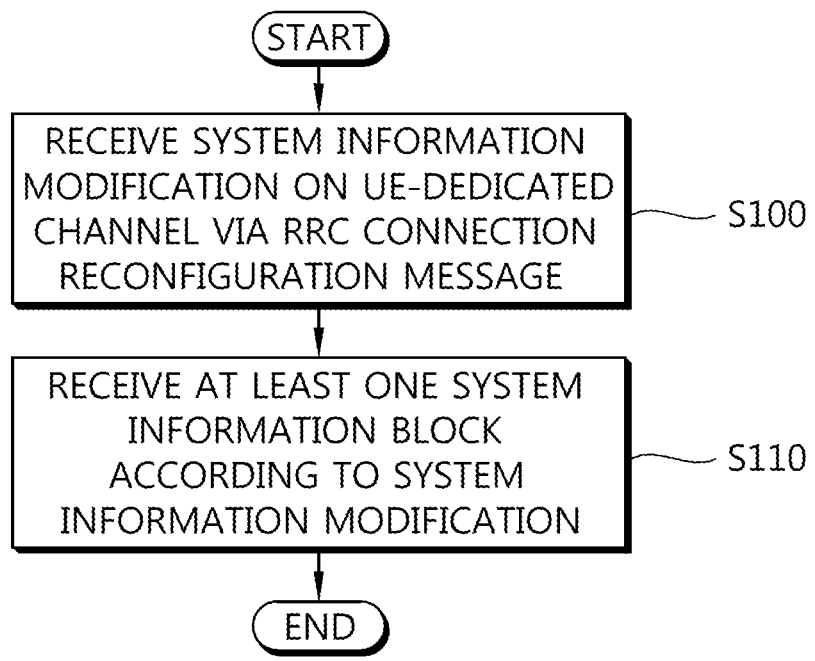
FIG. 13 shows an example of a method for receiving system information according to an embodiment of the present invention.

FIG. 13 shows an example of a method for receiving system information according to an embodiment of the present invention.

At step S100, the UE receives a system information modification from the eNB on a UE-dedicated channel via an RRC connection reconfiguration message. The system information modification may include a value tag indicating modification of system information. The system information modification, or the value tag, may be included in an SIB1, as described in Table 1, in the RRC connection reconfiguration message. The UE-dedicated channel may be a DCCH.

At step S110, the UE receives at least one system information block from the enB according to system information modification. The at least one system information block may be received on a broadcast channel. The at least one system information block is received in a next modification period, i.e. from a boundary of a modification period where the system information modification is received.

According to the embodiment of the present invention, the system information modification or the value tag may be provided via the RRC connection reconfiguration message, which is a UE-dedicated message, instead of the paging message. That is, for a UE in RRC_CONNECTED which may be unable to receive SystemInformationBlockType1, the eNB may provide the system information modification or the value tag via dedicated signaling using systemInformationBlockType1 Dedicated in RRCConnectionReconfiguration message. The eNB may ensure the UE has the valid system information, e.g. by providing systemInformationBlockType1 dedicated in RRCConnectionReconfiguration message before the UE considers stored system information to be invalid.

Table 9 shows an example of RRCConnectionReconfiguration message according to the embodiment of the present invention. RRCConnectionReconfiguration message of Table 9 is modified version of the RRCConnectionReconfiguration message of Table 2.

TABLE 9

```
-- ASN1START
RRCConnectionReconfiguration ::=            SEQUENCE {
    rrc-TransactionIdentifier                   RRC-TransactionIdentifier,
    criticalExtensions                          CHOICE {
        c1                                          CHOICE{
            rrcConnectionReconfiguration-r8             RRCConnectionReconfiguration-r8-IEs,
            spare7 NULL,
            spare6 NULL, spare5 NULL, spare4 NULL,
            spare3 NULL, spare2 NULL, spare1 NULL
        },
        criticalExtensionsFuture                    SEQUENCE { }
    }
}
RRCConnectionReconfiguration-r8-IEs ::= SEQUENCE {
    measConfig                                  MeasConfig                                      OPTIONAL, -- Need ON
    mobilityControlInfo                         MobilityControlInfo                 OPTIONAL,
-- Cond HO
    dedicatedInfoNASList                        SEQUENCE (SIZE(1..maxDRB)) OF
                                                    DedicatedInfoNAS
OPTIONAL, -- Cond nonHO
    radioResourceConfigDedicated                RadioResourceConfigDedicated
                                                                                    OPTIONAL
, -- Cond HO-toEUTRA
    securityConfigHO                            SecurityConfigHO
OPTIONAL, -- Cond HO
    nonCriticalExtension                        RRCConnectionReconfiguration-v890-IEs
OPTIONAL
}
RRCConnectionReconfiguration-v890-IEs ::= SEQUENCE {
    lateNonCriticalExtension                    OCTET   STRING
OPTIONAL, -- Need OP
    nonCriticalExtension                        RRCConnectionReconfiguration-v920-IEs
OPTIONAL
}
RRCConnectionReconfiguration-v920-IEs ::= SEQUENCE {
    otherConfig-r9                              OtherConfig-r9
OPTIONAL, -- Need ON
    fullConfig-r9                               ENUMERATED   {true}
OPTIONAL, -- Cond HO-Reestab
    nonCriticalExtension                        RRCConnectionReconfiguration-v1020-IEs
OPTIONAL
}
RRCConnectionReconfiguration-v1020-IEs ::= SEQUENCE {
    sCellToReleaseList-r10                      SCellToReleaseList-r10              OPTIONAL,
-- Need ON
    sCellToAddModList-r10                       SCellToAddModList-r10
```

TABLE 9-continued

```
    OPTIONAL,  -- Need ON
        nonCriticalExtension                    RRCConnectionReconfiguration-v11xx-IEs
    OPTIONAL
}
RRCConnectionReconfiguration-v11xx-IEs ::= SEQUENCE {
    systemInfomationBlockType1Dedicated-r11         OCTET STRING (CONTAINING
                                                    SystemInformationBlockType1)
    OPTIONAL,  -- Need ON
        nonCriticalExtension                        SEQUENCE { }
    OPTIONAL   -- Need OP
}
...
-- ASN1STOP
```

Referring to Table 9, RRCConnectionReconfiguration message includes systemInformationBlockType1 dedicated, which contains systemInformationBlockType1 message described in Table 1. Accordingly, the value tag included in the systemInformationBlockType1 message is transmitted via RRCConnectionReconfiguration message, which is a UE-dedicated message.

Figure 14:
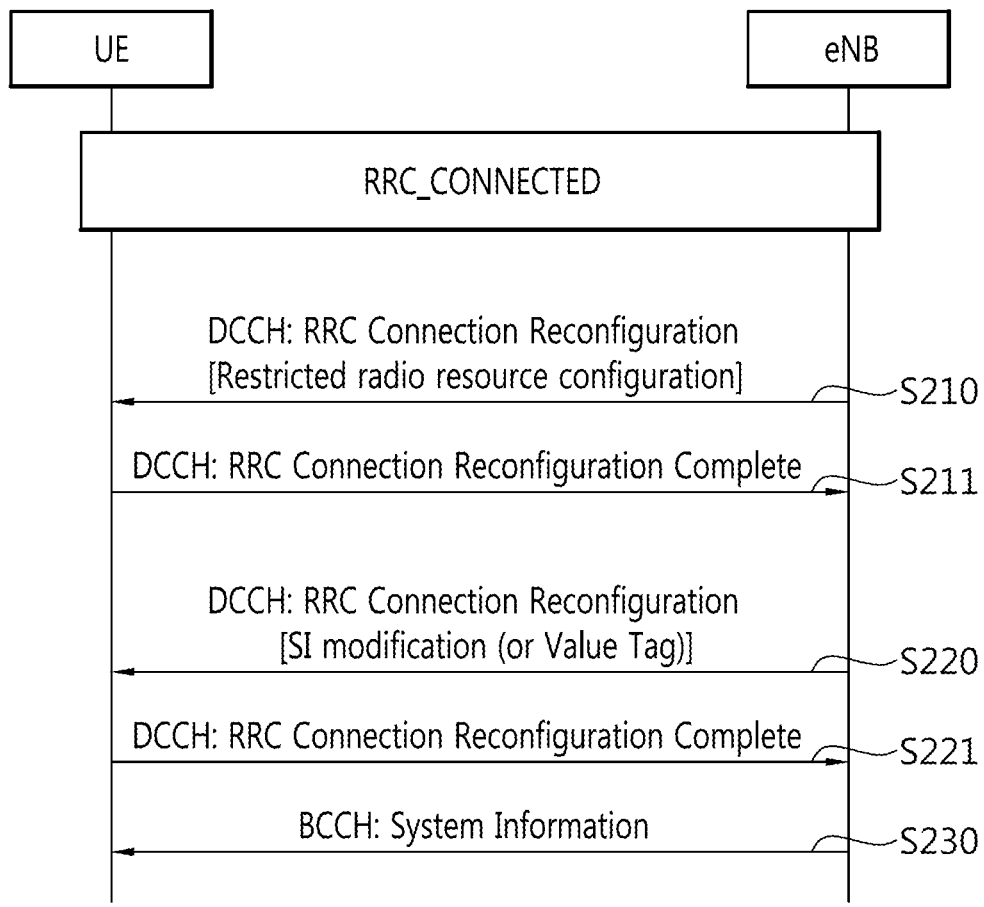
FIG. 14 shows another example of a method for receiving system information according to an embodiment of the present invention.

FIG. 14 shows another example of a method for receiving system information according to an embodiment of the present invention.

At step S210, if the UE is under inter-cell interference from neighboring cells, the eNB may configure restricted radio resource in the UE via an RRC connection reconfiguration procedure on a DCCH. After restricted radio resource configuration, the UE may use restricted subframes, such as ABS, to receive a certain cell with little inter-cell interference. If the UE is configured with the restricted radio resource, e.g. via the RRC connection reconfiguration procedure, the UE monitors a PDCCH carrying a paging RNTI (P-RNTI) and a paging message on the PDCCH via restricted radio resource, e.g. ABS. At step S211, the UE transmits an RRC connection reconfiguration complete message to the eNB on the DCCH.

If the UE is under severe inter-cell interference from neighboring cells, i.e. when the UE is in a coverage range extension region, the UE may fail to detect a system information modification via the paging message. Thus, at step S220, eNB indicates the system information modification to the UE via the RRC connection reconfiguration message on the DCCH, instead of the paging message on a PCCH.

Alternatively, the eNB can include a value tag in the RRC connection reconfiguration message. The value tag in the RRC connection reconfiguration message is the same as the value tag broadcast via an SIB1 on a BCCH, as described in Table 1, and used to indicate modification of system information.

At step S221, the UE transmits the RRC connection reconfiguration complete message to the eNB on the DCCH.

At step S230, upon receiving the system information modification in a modification period via the RRC connection reconfiguration message on the DCCH, the UE receives system information in the next modification period, i.e. from the boundary of the modification period where the UE completely received indication of the system information modification.

Alternatively, upon receiving the value tag in a modification period via the RRC connection reconfiguration message on the DCCH, the UE immediately starts to receive system information in the modification period where the UE received the value tag.

Figure 15:
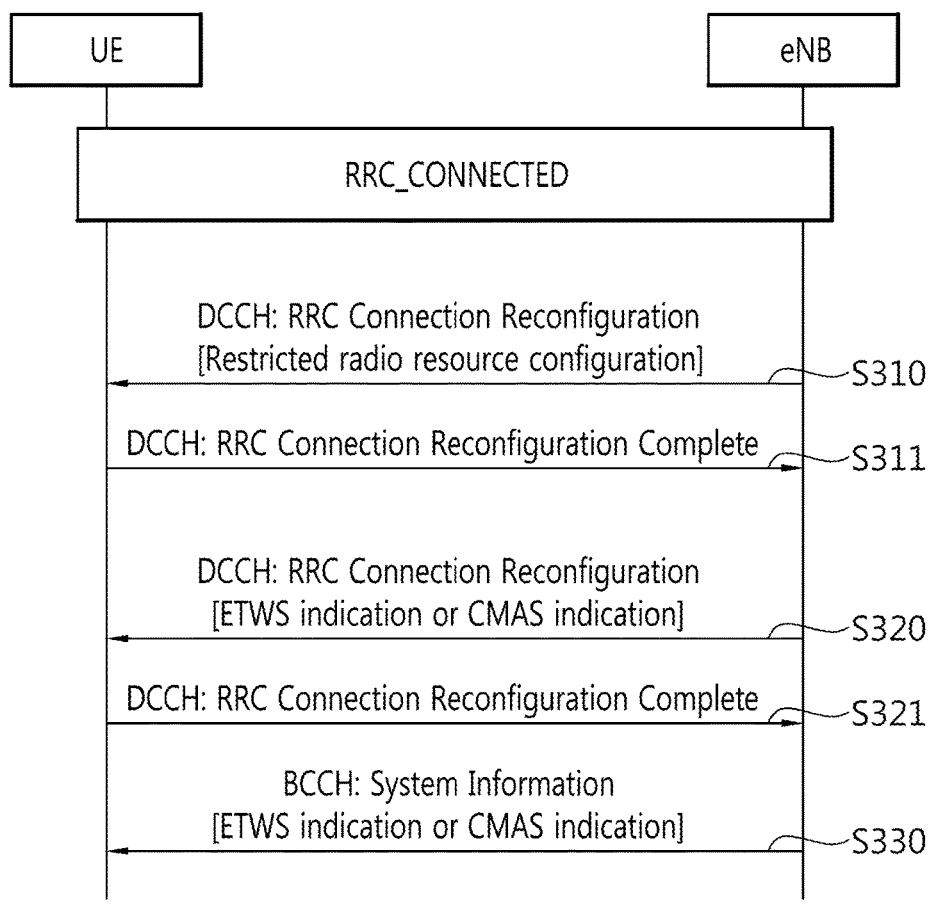
FIG. 15 shows an example of a method for receiving a warning message according to an embodiment of the present invention.

FIG. 15 shows an example of a method for receiving a warning message according to an embodiment of the present invention.

At step S310, if the UE is under inter-cell interference from neighboring cells, the eNB may configure restricted radio resource in the UE via an RRC connection reconfiguration procedure on a DCCH. After restricted radio resource configuration, the UE may use restricted subframes, such as ABS, to receive a certain cell with little inter-cell interference. If the UE is configured with the restricted radio resource, e.g. via the RRC connection reconfiguration procedure, the UE monitors a PDCCH carrying a paging RNTI (P-RNTI) and a paging message on the PDCCH via restricted radio resource, e.g. ABS. At step S311, the UE transmits an RRC connection reconfiguration complete message to the eNB on the DCCH.

If the UE is under severe inter-cell interference from neighboring cells, i.e. when the UE is in a coverage range extension region, the UE may fail to detect an earthquake and tsunami warning system (EWTS) indication or a commercial mobile alert system (CMAS) indication via the paging message. Thus, at step S320, the eNB indicates the ETWS/CMAS indication to the UE via the RRC connection reconfiguration message on the DCCH, instead of the paging message on a PCCH. At step S321, the UE transmits the RRC connection reconfiguration complete message to the eNB on the DCCH.

At step S330, upon receiving the ETWS/CMAS indication in a modification period via the RRC connection reconfiguration message on the DCCH, the UE immediately starts to receive SIB10, SIB11 or SIB12 which carries a PWS notification carrying warning message, such as an ETWS notification, CMAS notification.

Figure 16:
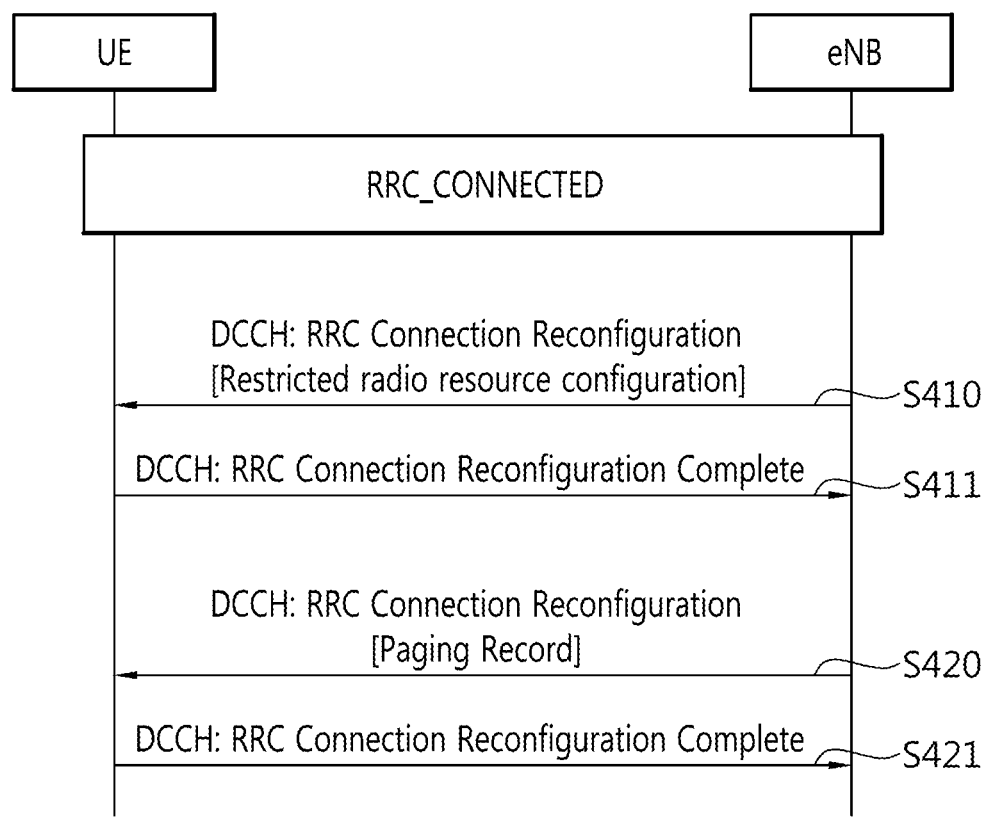
FIG. 16 shows an example of a method for receiving a paging record according to an embodiment of the present invention.

FIG. 16 shows an example of a method for receiving a paging record according to an embodiment of the present invention.

At step S410, if the UE is under inter-cell interference from neighboring cells, the eNB may configure restricted radio resource in the UE via an RRC connection reconfiguration procedure on a DCCH. After restricted radio resource configuration, the UE may use restricted subframes, such as ABS, to receive a certain cell with little inter-cell interference. If the UE is configured with the restricted radio resource, e.g. via the RRC connection reconfiguration procedure, the UE monitors a PDCCH carrying a paging RNTI (P-RNTI) and a paging message on the PDCCH via restricted radio resource, e.g. ABS. At step S411, the UE transmits an RRC connection reconfiguration complete message to the eNB on the DCCH.

If the UE is under severe inter-cell interference from neighboring cells, i.e. when the UE is in a coverage range extension region, the UE may fail to detect the PDCCH carrying the P-RNTI or to receive the paging message on a PCCH. Thus, at step S420, the eNB transmits a paging record to the UE via the RRC connection reconfiguration message on the DCCH, instead of the paging message on the PCCH. The paging record includes an identity of the paged UE, such as an SAE-temporary mobile subscriber identity (S-TMSI), international mobile subscriber identity (IMSI), and corresponding CN domain, i.e. either a circuit-switched (CS) domain or a packet-switched (PS) domain. At step S421, the UE transmits the RRC connection reconfiguration complete message to the eNB on the DCCH.

The RRC layer of the UE forwards the received paging record to the NAS layer of the UE. If UE's own UE identity is included in the paging record, the NAS layer of the UE may transmit a paging response message as a response to the paging record to the eNB.

Figure 17:
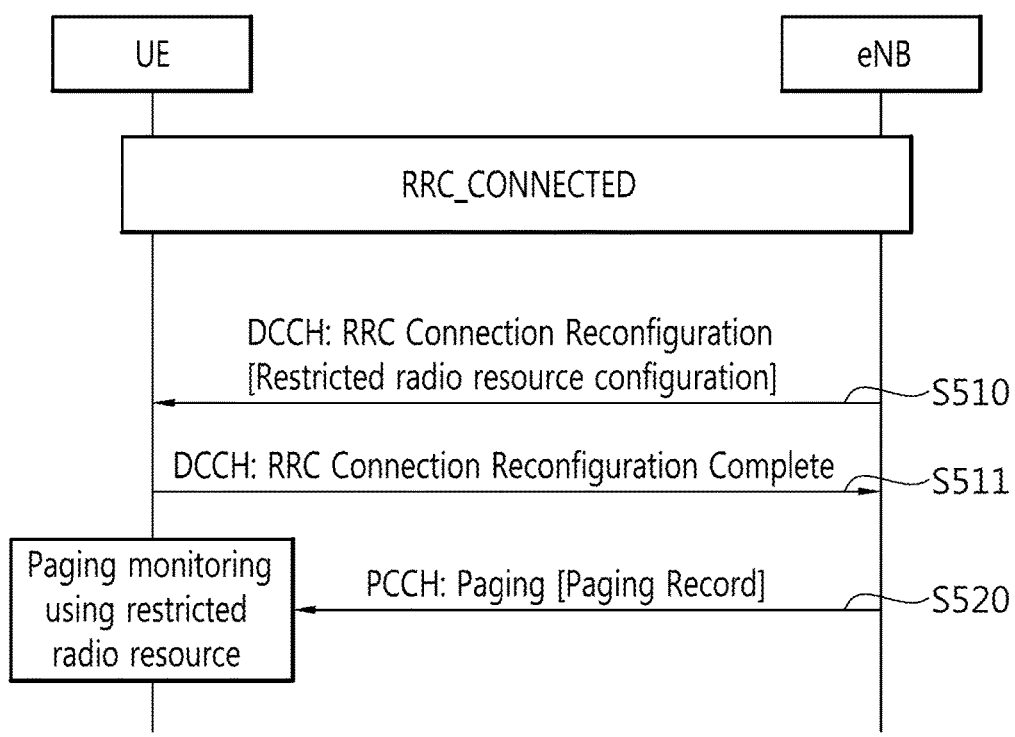
FIG. 17 shows another example of a method for receiving a paging record according to an embodiment of the present invention.

FIG. 17 shows another example of a method for receiving a paging record according to an embodiment of the present invention.

At step S510, if the UE is under inter-cell interference from neighboring cells, the eNB may configure restricted radio resource in the UE via an RRC connection reconfiguration procedure on a DCCH. After restricted radio resource configuration, the UE may use restricted subframes, such as ABS, to receive a certain cell with little inter-cell interference. If the UE is configured with the restricted radio resource, e.g. via the RRC connection reconfiguration procedure, the UE monitors a PDCCH carrying a paging RNTI (P-RNTI) and a paging message on the PDCCH via restricted radio resource, e.g. ABS. At step S511, the UE transmits an RRC connection reconfiguration complete message to the eNB on the DCCH.

If the UE is under severe inter-cell interference from neighboring cells, i.e. when the UE is in a coverage range extension region, at step S520, the UE monitors the paging message only within restricted radio resources (e.g., configured ABS). For this restricted paging monitoring, the eNB may indicate that the UE perform restricted paging monitoring. Alternatively, the UE decides to apply restricted paging monitoring when the UE is configured with high restricted radio resources with high positive bias to its serving cell to cope with the strong interference to the serving cell. The paging record includes an identity of the paged UE, such as an S-TMSI, IMSI, and corresponding CN domain, i.e. either a CS domain or a PS domain. At step S521, the UE transmits the RRC connection reconfiguration complete message to the eNB on the DCCH.

The RRC layer of the UE forwards the received paging record to the NAS layer of the UE. If UE's own UE identity is included in the paging record, the NAS layer of the UE may transmit a paging response message as a response to the paging record to the eNB.

Meanwhile, while the UE is connected to a cell, the UE needs to maintain valid system information of the cell. Thus, the UE periodically monitors system information broadcast at a cell. However, while the UE is in a CRE region, the UE may fail to receive broadcast SIB1. It is because if system frame numbers are aligned between two cells, the broadcast SIB1 from two cells would be overlapped. Due to this reason, inter-cell interference will cause the UE to fail to decode a PDCCH indicating SIB1 transmission on a physical downlink shared channel (PDSCH).

Figure 18:
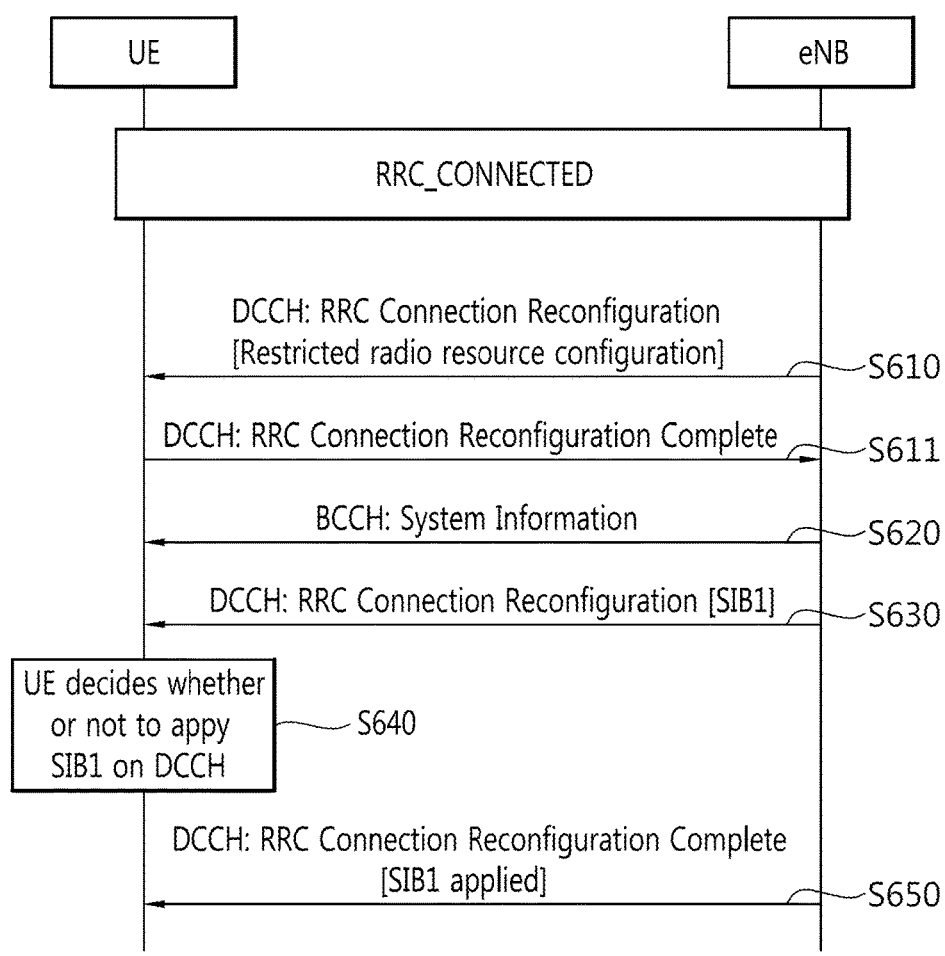
FIG. 18 shows another example of a method for receiving system information according to an embodiment of the present invention.

FIG. 18 shows another example of a method for receiving system information according to an embodiment of the present invention.

At step S610, if the UE is under inter-cell interference from neighboring cells, the eNB may configure restricted radio resource in the UE via an RRC connection reconfiguration procedure on a DCCH. Or, the UE may support ICIC. After restricted radio resource configuration, the UE may use restricted subframes, such as ABS, to receive a certain cell with little inter-cell interference. At step S611, the UE transmits an RRC connection reconfiguration complete message to the eNB on the DCCH.

At step S620, the UE monitors broadcast system information via a BCCH every modification period at a cell. The UE maintains up-to-date system information by receiving updated system information via the BCCH.

At step S630, when the system information is updated, the eNB may transmit updated SIB1 (i.e. dedicated SIB1) to the UE via the RRC connection reconfiguration message on the DCCH for the cell.

At step S640, the UE decides whether or not to apply the dedicated SIB1 received on the DCCH. If the UE successfully received both dedicated SIB1 on the DCCH and broadcast SIB1 on the BCCH in the same modification period at the cell, the UE may always prioritize the broadcast SIB1 on the BCCH. But, if the UE successfully received both dedicated SIB1 on the DCCH and broadcast SIB1 on the BCCH in different modification periods at the cell, the UE may always prioritize the recently received SIB1 on either the BCCH or the DCCH.

Namely, if the UE has previously received and stored broadcast SIB1 on the BCCH on a BCCH modification period and then, if the UE successfully receives the dedicated SIB1 on the DCCH in the same BCCH modification period where the broadcast SIB1 has been previously received, the UE ignores the dedicated SIB1 received on the DCCH (i.e. the UE keeps storing the broadcast SIB1 which has been received via the BCCH). If the dedicated SIB1 includes a certain information element not included in the broadcast SIB1, the UE applies either full information included in the dedicated SIB1 or only the information element.

However, if the UE has previously received and stored broadcast SIB1 on the BCCH on a BCCH modification period and then, if the UE successfully receives the dedicated SIB1 on the DCCH in a next BCCH modification period after the BCCH modification period where the broadcast SIB1 has been successfully received, the UE applies the dedicated SIB1 received on the DCCH (i.e. the UE replaces stored SIB1 with the received dedicated SIB1).

In other words, when the UE successfully receives the dedicated SIB1 on the DCCH in a BCCH modification period, if the UE has no broadcast SIB1 that has been successfully received on the BCCH in the same BCCH modification period, the UE applies the dedicated SIB1 received on the DCCH (i.e. the UE replaces stored SIB1 with the received dedicated SIB1).

But, when the UE successfully receives the dedicated SIB1 on the DCCH in a BCCH modification period, if the UE has the broadcast SIB1 that has been successfully received in the same BCCH modification period, the UE ignores the dedicated SIB1 received on the DCCH (i.e. the UE keeps storing the broadcast SIB1 which has been received via the BCCH).

At step S650, the UE indicates to the eNB whether or not the dedicated SIB1 is applied to the UE via the RRC connection reconfiguration complete message on the DCCH, as a response to the RRC connection reconfiguration message including the dedicated SIB1.

If the UE applies the dedicated SIB1 on the DCCH, the UE keeps storing the dedicated SIB1 as a valid SIB1 for this cell, until the UE receives the broadcast SIB1 on the BCCH or another dedicated SIB1 on the DCCH. Namely, the dedicated SIB1 is valid until overridden by another received SIB1. Or, if the UE applies the dedicated SIB1 on the DCCH, the UE keeps storing the dedicated SIB1 as a valid SIB1 for this cell until 3 hours elapse, unless the UE receives another SIB1. Namely, the dedicated SIB1 is valid only for 3 hours.

Alternatively, if both the broadcast SIB1 on the BCCH and the dedicated SIB1 on the DCCH are available in the UE, following three options may be considered according to an embodiment of the present invention.

1) Option 1: The UE shall prioritize the dedicated SIB1 on the DCCH over the broadcast SIB1 on the BCCH, all the times.

In the option 1, when the UE receives the dedicated SIB1 on the DCCH in a modification period, if stored SIB1 has been previously received on the DCCH, the UE replaces stored SIB1 with the dedicated SIB1 received on the DCCH, immediately or from the next modification period. Or, when the UE receives the dedicated SIB1 on the DCCH in a modification period, if stored SIB1 has been previously received on the BCCH, the UE replaces stored SIB1 with the dedicated SIB1 received on the DCCH, immediately or from the next modification period. Or, when the UE receives the dedicated SIB1 on the DCCH in a modification period, if no valid SIB1 is available in the UE, the UE stores the received SIB1.

When the UE receives the broadcast SIB1 on the BCCH in a modification period, if stored SIB1 has been previously received on the DCCH, the UE ignores the broadcast SIB1 on the BCCH. The SIB1 stored in the UE is not replaced. Or, when the UE receives the broadcast SIB1 on the BCCH in a modification period, if stored SIB1 has been previously received on the BCCH, the UE replaces stored SIB1 with the broadcast SIB1 received on the BCCH, immediately or from the next modification period. Or, when the UE receives the broadcast SIB1 on the BCCH in a modification period, if no valid SIB1 is available in the UE, the UE stores the received SIB1.

In the option 1, if the UE receives the dedicated SIB1 on the DCCH at a cell (and stores the received SIB1), the UE considers the dedicated SIB1 received on the DCCH to be valid during a specific time for the cell, until the UE receives another dedicated SIB1 on the DCCH at the cell in the next time. The eNB which the UE is connected to should signal the specific time to the UE via an RRC message on either the DCCH or BCCH. Or, the specific time is fixed to a specific value such as 3 hour. If 3 hours elapse since the dedicated SIB1 received on the DCCH has been stored in the UE, and if the stored SIB1 has been not replaced by another received SIB1 for 3 hours, the UE deletes the stored SIB1, and as a consequence, there will be no valid SIB1 in the UE.

2) Option 2: The UE shall prioritize the broadcast SIB1 on the BCCH over the dedicated SIB1 on the DCCH all the times.

In the option 2, when the UE receives the dedicated SIB1 on the DCCH in a modification period, if stored SIB1 has been previously received on the DCCH, the UE replaces stored SIB1 with the dedicated SIB1 received on the DCCH, immediately or from the next modification period. Or, when the UE receives the dedicated SIB1 on the DCCH in a modification period, if stored SIB1 has been previously received on the BCCH, the UE ignores the dedicated SIB1 on the DCCH. The SIB1 stored in the UE is not replaced. Or, when the UE receives the dedicated SIB1 on the DCCH in a modification period, if no valid SIB1 is available in the UE, the UE stores the received SIB1.

When the UE receives the broadcast SIB1 on the BCCH in a modification period, if stored SIB1 has been previously received on the DCCH, the UE replaces stored SIB1 with the broadcast SIB1 received on the BCCH, immediately or from the next modification period. Or, when the UE receives the broadcast SIB1 on the BCCH in a modification period, if stored SIB1 has been previously received on the BCCH, the UE replaces stored SIB1 with the broadcast SIB1 received on the BCCH, immediately or from the next modification period. Or, when the UE receives the broadcast SIB1 on the BCCH in a modification period, if no valid SIB1 is available in the UE, the UE stores the received SIB1.

In the option 2, if the UE receives the dedicated SIB1 on the DCCH at a cell and stores the received SIB1, the stored SIB1 remains in the UE as a valid SIB1 for the cell, unless the stored SIB1 is replaced by a new SIB1 recently received at the cell.

2) Option 3: The UE shall prioritize the recently received SIB1 over the stored or previously received SIB1, whichever channel the UE received the SIB1 on. Thus, if the SIB1 that the UE has previously received and stored is available as a valid SIB1, whenever the UE receives the SIB1 on either the DCCH or BCCH, the UE replaces the stored SIB1 with the received SIB1, whichever channel the stored SIB1 has been previously received on.

When the UE receives the dedicated SIB1 on the DCCH in a modification period, if stored SIB1 has been previously received on the DCCH, the UE replaces stored SIB1 with the dedicated SIB1 received on the DCCH, immediately or from the next modification period. Or, when the UE receives the dedicated SIB1 on the DCCH in a modification period, if stored SIB1 has been previously received on the BCCH, the UE replaces stored SIB1 with the dedicated SIB1 received on the DCCH, immediately or from the next modification period. Or, when the UE receives the dedicated SIB1 on the DCCH in a modification period, if no valid SIB1 is available in the UE, the UE stores the received SIB1.

When the UE receives the broadcast SIB1 on the BCCH in a modification period, if stored SIB1 has been previously received on the DCCH, the UE replaces stored SIB1 with the broadcast SIB1 received on the BCCH, immediately or from the next modification period. Or, when the UE receives the broadcast SIB1 on the BCCH in a modification period, if stored SIB1 has been previously received on the BCCH, the UE replaces stored SIB1 with the broadcast SIB1 received on the BCCH, immediately or from the next modification period. Or, when the UE receives the broadcast SIB1 on the BCCH in a modification period, if no valid SIB1 is available in the UE, the UE stores the received SIB1.

In the option 3, if the UE receives the dedicated SIB1 on the DCCH at a cell and stores the received SIB1, the stored SIB1 remains in the UE as a valid SIB1 for the cell, unless the stored SIB1 is replaced by a new SIB1 recently received at the cell.

Figure 19:
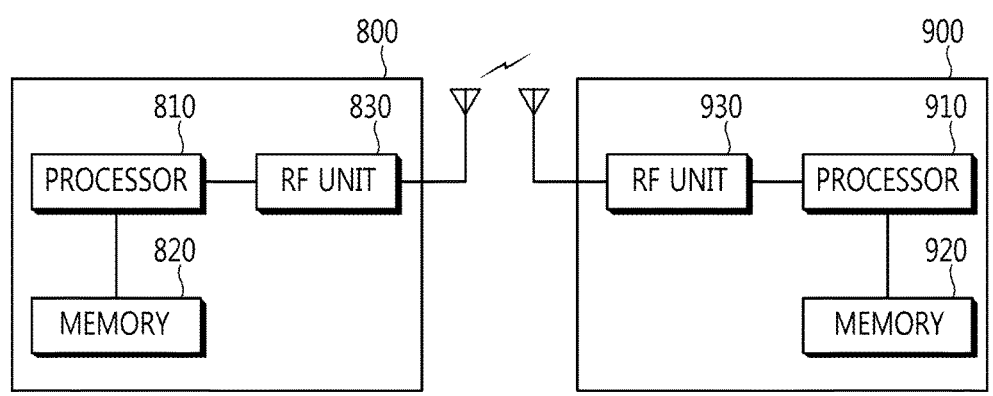
FIG. 19 is a block diagram showing wireless communication system to implement an embodiment of the present invention.

FIG. 19 is a block diagram showing wireless communication system to implement an embodiment of the present invention.

An eNB 800 may include a processor 810, a memory 820 and a radio frequency (RF) unit 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A UE 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for receiving, by a user equipment (UE), system information in a wireless communication system, the method comprising:
   receiving, by the UE from an eNodeB (eNB), a radio resource control (RRC) connection reconfiguration message including a value tag, which indicates modification of the system information, on a UE-dedicated channel; and
   receiving, by the UE from the eNB, at least one system information block according to the value tag,
   wherein the UE-dedicated channel is a dedicated control channel (DCCH),
   wherein the UE is in a coverage range extension (CRE) region.

2. The method of claim 1, wherein the value tag is included in a system information block type 1 (SIB1) in the RRC connection reconfiguration message.

3. The method of claim 1, wherein the at least one system information block is received on a broadcast channel.

4. The method of claim 1, wherein the at least one system information block is received in a next modification period.

5. The method of claim 1, wherein the at least one system information block is received on a boundary of a modification period where the value tag is received.

6. The method of claim 1, wherein the UE is in an RRC connected state.

7. The method of claim 1, wherein the UE is not able to receive the value on a broadcast channel.

8. The method of claim 1 further comprising:
   receiving, by the UE from the eNB, a restricted radio resource configuration via the RRC connection reconfiguration message.

9. The method of claim 8, further comprising:
   using restricted subframes according to the restricted radio resource configuration.

10. A method for transmitting, by an evolved NodeB (eNB), system information in a wireless communication system, the method comprising:
    transmitting, by the eNB to a user equipment (UE), a radio resource control (RRC) connection reconfiguration message including a value tag, which indicates modification of the system information, on a UE-dedicated channel; and
    transmitting, by the eNB to the UE, at least one system information block according to the value tag,
    wherein the UE-dedicated channel is a dedicated control channel (DCCH),
    wherein the UE is in a coverage range extension (CRE) region.

11. The method of claim 10, wherein the value tag is included in a system information block type 1 (SIB1) in the RRC connection reconfiguration message.

12. The method of claim 10, wherein the at least one system information block is transmitted in a next modification period.

13. The method of claim 10, wherein the at least one system information block is transmitted on a boundary of a modification period where the value tag is transmitted.

14. The method of claim 10, further comprising:
    transmitting, by the eNB to the UE, a restricted radio resource configuration via the RRC connection reconfiguration message.

* * * * *